(12) United States Patent
Carnevali (10) Patent No.: US 12,305,799 B2
(45) Date of Patent: May 20, 2025

(54) VIBRATION DAMPENING MOUNTS AND METHODS OF MAKING AND USING

(71) Applicant: National Products, Inc., Seattle, WA (US)

(72) Inventor: Jeffrey D. Carnevali, Seattle, WA (US)

(73) Assignee: National Products, Inc., Seattle, WA (US)

( * ) Notice: Subject to any disclaimer, the term of this patent is extended or adjusted under 35 U.S.C. 154(b) by 115 days.

(21) Appl. No.: 18/136,758

(22) Filed: Apr. 19, 2023

(65) Prior Publication Data
US 2024/0353054 A1    Oct. 24, 2024

(51) Int. Cl.
*F16M 13/02*  (2006.01)
*F16F 15/04*  (2006.01)

(52) U.S. Cl.
CPC ............. *F16M 13/02* (2013.01); *F16F 15/04* (2013.01); *F16F 2230/04* (2013.01); *F16F 2232/08* (2013.01); *F16F 2238/026* (2013.01)

(58) Field of Classification Search
CPC ...... F16M 13/02; F16F 15/04; F16F 2230/04; F16F 2232/08; F16F 2238/026
USPC ........................................................ 248/603
See application file for complete search history.

(56) References Cited

U.S. PATENT DOCUMENTS

| | | |
|---|---|---|
| 180,881 A | 8/1876 | Howson |
| 538,534 A | 4/1895 | Neill |
| 596,729 A | 1/1898 | White |
| 842,007 A | 1/1907 | Parker |
| 855,149 A | 5/1907 | Vaughn et al. |
| 890,656 A | 6/1908 | Johnson |
| 892,105 A | 6/1908 | White |
| 958,052 A | 5/1910 | Williams |
| 1,009,913 A | 11/1911 | Maguire et al. |
| 1,280,013 A | 9/1918 | Goddard |
| 1,359,645 A | 11/1920 | Zink |
| 1,455,441 A | 5/1923 | Hodny |
| 1,509,068 A | 9/1924 | Herron |
| 1,934,223 A | 11/1933 | Booth |

(Continued)

OTHER PUBLICATIONS

Yakattack.us, 7 pages of product description of GearTrac retrieved from web site at: www.yakattack.us/by-product-name/geartrac/.

(Continued)

*Primary Examiner* — Muhammad Ijaz
(74) *Attorney, Agent, or Firm* — Branch Partners PLLC; Bruce E. Black (57) ABSTRACT

A mount includes a floating unit having a floating flange that includes at least six fingers extending from a central portion; a base unit having a base housing that includes spring mounts extending inwardly from the exterior walls; first springs disposed in the base housing and oriented parallel to a first floating axis, where each of the first springs is mounted on at least one of the spring mounts and receives a portion of one of the fingers of the floating flange that extends between adjacent coils of the first spring; and second springs disposed in the base housing and oriented orthogonally to the first springs, where each of the second springs is mounted on at least one of the spring mounts and receives a portion of one of the fingers of the floating flange extending into the second spring.

20 Claims, 7 Drawing Sheets

(56) References Cited

U.S. PATENT DOCUMENTS

| | | |
|---|---|---|
| 2,029,089 A | 1/1936 | Weirauch |
| 2,114,767 A | 4/1938 | Hodny et al. |
| 2,121,317 A | 6/1938 | Cohen |
| D142,057 S | 8/1945 | Baxter |
| 2,533,867 A | 12/1950 | Zink |
| 2,560,556 A | 7/1951 | Creedon |
| 2,752,173 A | 6/1952 | Krooss |
| 2,650,788 A | 9/1953 | Hulstein |
| 2,688,504 A | 9/1954 | Parker |
| 2,710,609 A | 6/1955 | Giller |
| 2,723,823 A | 11/1955 | Polk |
| 2,859,710 A | 11/1958 | Elsner |
| 2,861,501 A | 11/1958 | Strelakos |
| 3,096,061 A | 7/1963 | Bertell |
| 3,252,677 A | 5/1966 | Raymond |
| 3,304,038 A | 2/1967 | Guthrie |
| 3,605,637 A | 9/1971 | Prete, Jr. |
| 3,652,050 A | 3/1972 | Marrujo et al. |
| 3,758,055 A * | 9/1973 | Adams .................. B64D 17/383 244/151 B |
| 3,779,502 A | 12/1973 | Marberg |
| 3,843,272 A | 10/1974 | Jorn |
| 4,060,241 A | 11/1977 | Hegel |
| 4,060,331 A | 11/1977 | Domer et al. |
| 4,066,231 A | 1/1978 | Bahner |
| 4,066,311 A | 1/1978 | Poulson |
| D247,420 S | 3/1978 | Reynolds |
| 4,085,684 A | 4/1978 | McLennan et al. |
| 4,183,387 A | 1/1980 | Lenz |
| 4,205,486 A | 6/1980 | Guarnacci |
| 4,222,680 A | 9/1980 | Browning |
| 4,225,258 A | 9/1980 | Thompson |
| 4,307,864 A | 12/1981 | Benoit |
| 4,461,284 A | 7/1984 | Fackler |
| 4,491,435 A | 1/1985 | Meier |
| 4,585,197 A | 4/1986 | Liautaud et al. |
| 4,611,839 A | 9/1986 | Rung et al. |
| 4,620,813 A | 11/1986 | Lacher |
| 4,641,986 A | 2/1987 | Tsui et al. |
| 4,677,794 A | 7/1987 | Parron et al. |
| 4,688,843 A | 8/1987 | Hall |
| 4,796,508 A | 1/1989 | Hoshino |
| 4,800,795 A | 1/1989 | Yamashita |
| 4,805,784 A | 2/1989 | Solheim et al. |
| 4,842,308 A | 6/1989 | Spotts |
| 4,872,630 A | 10/1989 | Cooper |
| 4,950,099 A | 8/1990 | Roellin |
| 5,071,279 A | 12/1991 | Rustrom |
| 5,092,551 A | 3/1992 | Meier |
| 5,103,605 A * | 4/1992 | Sul ........................ E04H 9/0235 52/167.4 |
| 5,109,321 A | 4/1992 | Maglica et al. |
| 5,118,058 A | 6/1992 | Richter |
| 5,241,796 A | 9/1993 | Hellwig et al. |
| 5,251,859 A | 10/1993 | Cyrell et al. |
| 5,259,711 A | 11/1993 | Beck |
| 5,270,911 A | 12/1993 | Maglica et al. |
| 5,284,098 A | 2/1994 | Klapperich et al. |
| 5,305,700 A | 4/1994 | Strong et al. |
| 5,419,522 A | 5/1995 | Luecke et al. |
| 5,441,225 A | 8/1995 | Hall |
| 5,564,668 A | 10/1996 | Crowe |
| 5,628,597 A | 5/1997 | Chudoba et al. |
| 5,727,858 A | 3/1998 | Shapiro |
| 5,823,724 A | 10/1998 | Lee |
| 5,845,885 A | 12/1998 | Carnevali |
| 6,173,926 B1 | 1/2001 | Elvegaard |
| 6,308,642 B1 | 10/2001 | Branam et al. |
| 6,561,476 B2 | 5/2003 | Carnevali |
| 6,581,892 B2 | 6/2003 | Carnevali |
| 6,588,722 B2 | 7/2003 | Eguchi et al. |
| 6,666,420 B1 | 12/2003 | Carnevali |
| 6,688,568 B1 | 2/2004 | Moufflet |
| 6,695,183 B2 | 2/2004 | Hancock et al. |
| 6,789,988 B1 | 9/2004 | Moradians |
| 6,846,140 B2 | 1/2005 | Anderson et al. |
| 6,883,487 B2 * | 4/2005 | Lehmann ............... F16F 15/283 123/192.1 |
| 6,902,089 B2 | 6/2005 | Carnevali |
| 6,945,414 B1 | 9/2005 | Stevens et al. |
| 7,090,181 B2 | 8/2006 | Biba et al. |
| 7,100,808 B2 | 9/2006 | Hancock et al. |
| 7,159,998 B2 | 1/2007 | Moreland |
| D539,639 S | 4/2007 | Nagle |
| 7,277,240 B2 | 10/2007 | Carnevali |
| 7,320,450 B2 | 1/2008 | Carnevali |
| D563,781 S | 3/2008 | Carnevali |
| D564,062 S | 3/2008 | Carnevali |
| 7,337,934 B2 | 3/2008 | Alling et al. |
| 7,401,995 B2 | 7/2008 | Senakiewich, II |
| 7,422,184 B2 | 9/2008 | Carnevali |
| D588,903 S | 3/2009 | Carnevali |
| D589,327 S | 3/2009 | Carnevali |
| D590,696 S | 4/2009 | Carnevali |
| 7,523,904 B2 | 4/2009 | Carnevali |
| 7,551,458 B2 | 6/2009 | Carnevali |
| 7,556,463 B1 | 7/2009 | Hall |
| 7,571,522 B2 | 8/2009 | Carnevali |
| 7,607,622 B2 | 10/2009 | Carnevali |
| 7,682,543 B2 * | 3/2010 | Carnevali ........... B29C 45/1676 248/346.11 |
| 7,731,140 B2 | 6/2010 | Carnevali |
| 7,774,973 B2 | 8/2010 | Carnevali |
| D629,080 S | 12/2010 | Dole et al. |
| 7,849,630 B2 | 12/2010 | Carnevali |
| 7,850,133 B2 | 12/2010 | Carnevali |
| 7,854,204 B2 | 12/2010 | Dacus |
| RE42,060 E | 1/2011 | Carnevali |
| 7,887,018 B2 | 2/2011 | Carnevali |
| 7,950,701 B2 | 5/2011 | Dole et al. |
| 7,954,773 B2 | 6/2011 | Carnevali |
| 7,975,971 B2 | 7/2011 | Carnevali |
| 7,980,798 B1 | 7/2011 | Kuehn et al. |
| RE42,581 E | 8/2011 | Carnevali |
| 7,988,106 B2 | 8/2011 | Carnevali |
| 7,997,554 B2 | 8/2011 | Carnevali |
| 8,020,828 B2 | 9/2011 | Carnevali |
| 8,037,904 B2 | 10/2011 | Carnevali |
| 8,156,681 B2 | 4/2012 | Carnevali |
| 8,201,788 B2 | 6/2012 | Carnevali |
| 8,235,340 B2 | 8/2012 | Carnevali |
| RE43,806 E | 11/2012 | Carnevali |
| 8,322,955 B2 | 12/2012 | Arnesen et al. |
| 8,408,853 B2 | 4/2013 | Womack et al. |
| 8,454,178 B2 | 6/2013 | Carnevali |
| 8,505,861 B2 * | 8/2013 | Carnevali ............... F16B 47/00 248/188.7 |
| 8,534,519 B2 | 9/2013 | Hancock et al. |
| 8,544,161 B2 * | 10/2013 | Carnevali ............... F16M 13/00 379/455 |
| 8,590,855 B2 | 11/2013 | Carnevali |
| 8,622,359 B2 * | 1/2014 | Carnevali ........... F16M 13/022 248/316.1 |
| 8,651,289 B2 | 2/2014 | Diaz, Jr. et al. |
| 8,776,698 B2 | 7/2014 | Pherson |
| 8,992,238 B2 | 3/2015 | Chinn |
| 9,056,580 B2 | 6/2015 | Baldsiefen et al. |
| 9,180,925 B2 | 11/2015 | Carnevali |
| 9,253,970 B2 | 2/2016 | Carnevali |
| 9,365,150 B2 | 6/2016 | Baldsiefen et al. |
| 9,379,504 B2 | 6/2016 | Chinn |
| 9,568,148 B2 | 2/2017 | Carnevali |
| 9,623,787 B2 | 4/2017 | Sterling |
| 9,671,060 B1 | 6/2017 | Cifers |
| 9,828,073 B1 | 11/2017 | Cifers, III |
| 9,831,904 B1 | 11/2017 | Carnevali |
| 9,944,217 B2 | 4/2018 | Schroeder et al. |
| 9,975,466 B2 | 5/2018 | Hendren et al. |
| 9,987,993 B2 | 6/2018 | Thorimbert |
| 10,155,306 B1 | 12/2018 | Carnevali |
| 10,378,690 B2 | 8/2019 | Carnevali |
| 10,429,002 B2 | 10/2019 | Carnevali |
| 10,448,626 B2 | 10/2019 | Carnevali |
| 10,527,219 B2 | 1/2020 | Carnevali |

(56) References Cited

U.S. PATENT DOCUMENTS

| | | | |
|---|---|---|---|
| 10,823,329 B1 * | 11/2020 | Dammermann | F16B 2/10 |
| 2002/0166935 A1 | 11/2002 | Carnevali | |
| 2003/0042282 A1 | 3/2003 | Gates et al. | |
| 2003/0185008 A1 | 10/2003 | Moreland | |
| 2004/0178309 A1 | 9/2004 | Crowley et al. | |
| 2004/0262479 A1 | 12/2004 | Jopling | |
| 2005/0036848 A1 | 2/2005 | Cunningham et al. | |
| 2005/0092876 A1 | 5/2005 | Carnevali | |
| 2005/0132937 A1 | 6/2005 | Branam | |
| 2006/0000957 A1 | 1/2006 | Carnevali | |
| 2006/0102823 A1 | 5/2006 | Carnevali | |
| 2007/0170328 A1 * | 7/2007 | Fortes | F16M 13/02 248/288.31 |
| 2008/0115344 A1 | 5/2008 | Carnevali | |
| 2008/0296334 A1 | 12/2008 | Carnevali | |
| 2009/0014584 A1 | 1/2009 | Ruddock et al. | |
| 2009/0095206 A1 | 4/2009 | Dacus | |
| 2009/0108151 A1 | 4/2009 | Carnevali | |
| 2009/0108152 A1 | 4/2009 | Carnevali | |
| 2009/0140112 A1 | 6/2009 | Carnevali | |
| 2009/0241293 A1 | 10/2009 | Swerdlick | |
| 2010/0149059 A1 * | 6/2010 | Patel | H01Q 3/08 343/765 |
| 2010/0282802 A1 | 11/2010 | Carnevali | |
| 2010/0284199 A1 | 11/2010 | Carnevali | |
| 2010/0288843 A1 | 11/2010 | Arnesen et al. | |
| 2011/0097177 A1 | 4/2011 | Carnevali | |
| 2012/0006948 A1 | 1/2012 | Hiss et al. | |
| 2012/0181409 A1 | 7/2012 | Hayahara et al. | |
| 2012/0217353 A1 | 8/2012 | Hennon | |
| 2012/0318937 A1 * | 12/2012 | Carnevali | F16M 11/041 248/122.1 |
| 2013/0133158 A1 | 5/2013 | Tran | |
| 2014/0003878 A1 | 1/2014 | Knox et al. | |
| 2014/0034794 A1 | 2/2014 | Carnevali | |
| 2014/0226315 A1 | 8/2014 | Nicieja et al. | |
| 2014/0248103 A1 | 9/2014 | Baldsiefen et al. | |
| 2015/0030386 A1 | 1/2015 | Carnevali | |
| 2015/0275942 A1 | 10/2015 | Carnevali | |
| 2016/0288691 A1 | 10/2016 | Aubrey et al. | |
| 2017/0209318 A1 | 7/2017 | Schroeder et al. | |
| 2020/0191235 A1 * | 6/2020 | Liang | F16F 15/085 |
| 2021/0140511 A1 * | 5/2021 | Bonessio | F16F 15/021 |

OTHER PUBLICATIONS

Yakattack.us, 4 pages of product description of GTTL retrieved from web site at: www.yakattack.us/geartrac/gttl/.

Yakattack.us, 6 pages of product description of GTSL90 retrieved from web site at: www.yakattack.us/by-product-name/geartrac/gts190/.

Yakattack.us, 5 pages of product description of GT90 retrieved from web site at: www.yakattack.us/geartrac/gt90/.

Yakattack.us, 4 pages of product description of GT175 retrieved from web site at: www.yakattack.us/geartrac/gt175/.

* cited by examiner

VIBRATION DAMPENING MOUNTS AND METHODS OF MAKING AND USING

FIELD

The present invention is directed to mounts for mobile devices and other objects and methods of making and using. The present invention is also directed to mounts with vibration dampening and methods of making and using.

BACKGROUND

Providing mounts for holding, retaining, or securing objects has proven beneficial for many different uses. Some mountable-objects, such as electronic devices (e.g., phones, laptops, tablets, visual-enhancement devices, positioning devices, or the like), or manual-activity-based objects (e.g., cylindrical elements, oars, or the like) are increasingly used in situations where mounting the object to a surface increases the convenience of using the object. For example, mounts may eliminate the need to hold an object, or prop the device up, in order to use the object, thereby allowing a user to use the object more efficiently, or while simultaneously engaging in other activities which may benefit from the use of both hands without the encumberment of holding or propping-up the object. In some instances, mounting an object may increase user safety by enabling use of the object, without the distraction of holding the object.

In some instances, however, the mounts may be attached to objects, such as vehicles, or surfaces that produce vibrations. It is desirable to dampen the transmission of the vibration to another object, such as a mobile device, which is attached to the mount.

BRIEF SUMMARY

One embodiment is a mount that includes a floating unit including a floating flange, wherein the floating flange includes a central portion and at least six fingers extending from the central portion and distributed around a perimeter of the central portion; a base unit including a base housing, the base housing including exterior walls and a plurality of spring mounts extending inwardly from the exterior walls; a plurality of first springs disposed in the base housing and oriented parallel to a first floating axis, wherein each of the first springs is mounted on at least one of the spring mounts and receives a portion of one of the fingers of the floating flange that extends orthogonally relative to the first floating axis and between adjacent coils of the first spring; and a plurality of second springs disposed in the base housing and oriented orthogonally to the first springs, where each of the second springs is mounted on at least one of the spring mounts and receives a portion of one of the fingers of the floating flange extending into the second spring, wherein the first and second springs allow the floating unit and base unit to move relative to each other.

In at least some embodiments, the base housing defines a plurality of spring receptacles, wherein the first springs are disposed within the spring receptacles of the base unit. In at least some embodiments, the base housing includes a plurality of interior walls, wherein the interior walls and the exterior walls define the spring receptacles. In at least some embodiments, the plurality of spring mounts includes a plurality of pairs of opposing spring mounts, wherein each of the pairs of opposing spring mounts is disposed in a different one of the spring receptacles.

In at least some embodiments, each of the fingers of the floating flange that are received by the first springs includes a body and at least one protrusion extending from the body parallel to the first floating axis. In at least some embodiments, the base unit further includes a base flange coupled to the base housing and configured for coupling to a device or a surface.

In at least some embodiments, the floating unit further includes a mounting flange coupled to the floating flange and configured for coupling to a device or a surface. In at least some embodiments, the mounting flange is made of material having a durometer in a range of 70 to 90 Shore A. In at least some embodiments, the mounting flange is made of thermoplastic rubber, thermoplastic elastomer, thermoplastic polyurethane, or any combination thereof.

In at least some embodiments, the mount further includes vibration dampening grease disposed around at least one of the first or second springs. In at least some embodiments, the mount further includes vibration dampening grease disposed between the floating flange and the base housing.

Another embodiment is a mount that includes a base housing including exterior walls defining a cavity within the base housing; at least three first compression springs disposed in the base housing and oriented parallel to a first floating axis; at least three second compression springs oriented orthogonally to the first compression springs; and a floating flange suspended within the cavity of the base housing by the first compression springs and the second compression springs so that the floating flange and base housing can move relative to each other.

In at least some embodiments, the mount further includes a mounting flange coupled to the floating flange and configured for coupling to a device or a surface. In at least some embodiments, the mount further includes a base flange coupled to the base housing and configured for coupling to a device or a surface.

In at least some embodiments, the mount further includes vibration dampening grease disposed around at least one of the first or second springs. In at least some embodiments, the mount further includes vibration dampening grease disposed between the floating flange and the base housing.

Yet another embodiment is a system including any of the mounts described above and a first mounting arrangement, for coupling the mount to a first object, coupled to any one of the floating flange, the base housing, the mounting flange, or the base flange. In at least some embodiments, the system further includes a second mounting arrangement, for coupling the mount to a second object, coupled to another one of the floating flange, the base housing, the mounting flange, or the base flange.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to mounts for mobile devices and other objects and methods of making and using. The present invention is also directed to mounts with vibration dampening and methods of making and using.

Figure 1A:
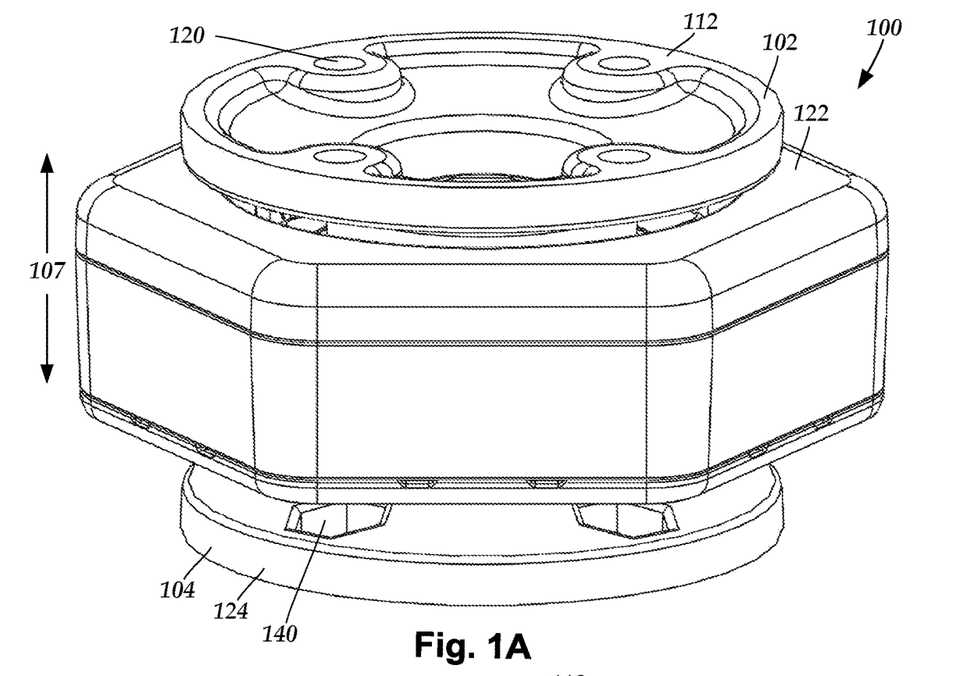
FIG. 1A is a schematic perspective view of one embodiment of a mount, according to the invention.
Figure 1B:
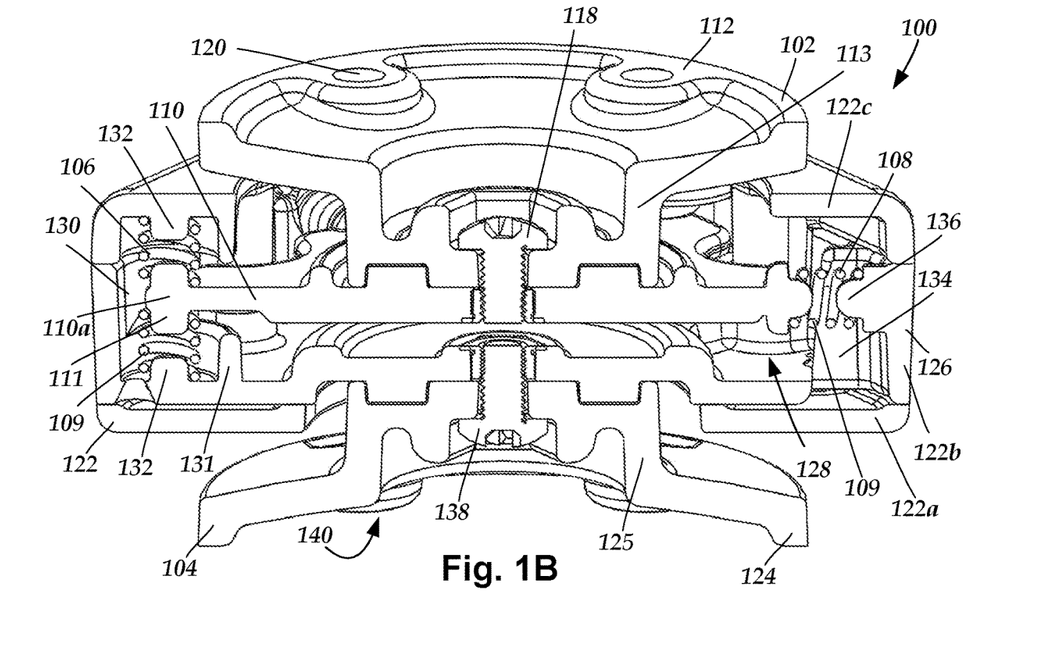
FIG. 1B is a schematic perspective, cross-sectional view of the mount of FIG. 1A, according to the invention.

FIGS. 1A and 1B illustrate one embodiment of a mount 100 with reduced transmission (e.g., dampening) of vibration. The mount 100 includes a floating unit 102, a base unit 104, multiple first springs 106 oriented parallel to a first floating axis 107, and multiple second springs 108 that are positioned orthogonal to the first set of springs. The floating unit 102 can include a floating flange 110 and an optional mounting flange 112 that is coupled to the floating flange. The base unit 104 can include a base housing 122 and an optional base flange 124 that is coupled to the base housing.

In at least some embodiments, the first and second springs 106, 108 are compression springs. The first and second springs 106, 108 allow the floating unit 102 and base unit 104 to move relative to each other and, thereby, reduce the transmission of (e.g., dampen) vibration between the floating unit and the base unit. When the first floating axis 107 is assigned as the z-axis, the first springs 106 are oriented parallel to the z-axis and provide dampening along the z-axis. The second springs are oriented in the x-y plane and provide dampening along the x- and y-axes.

Figure 2:
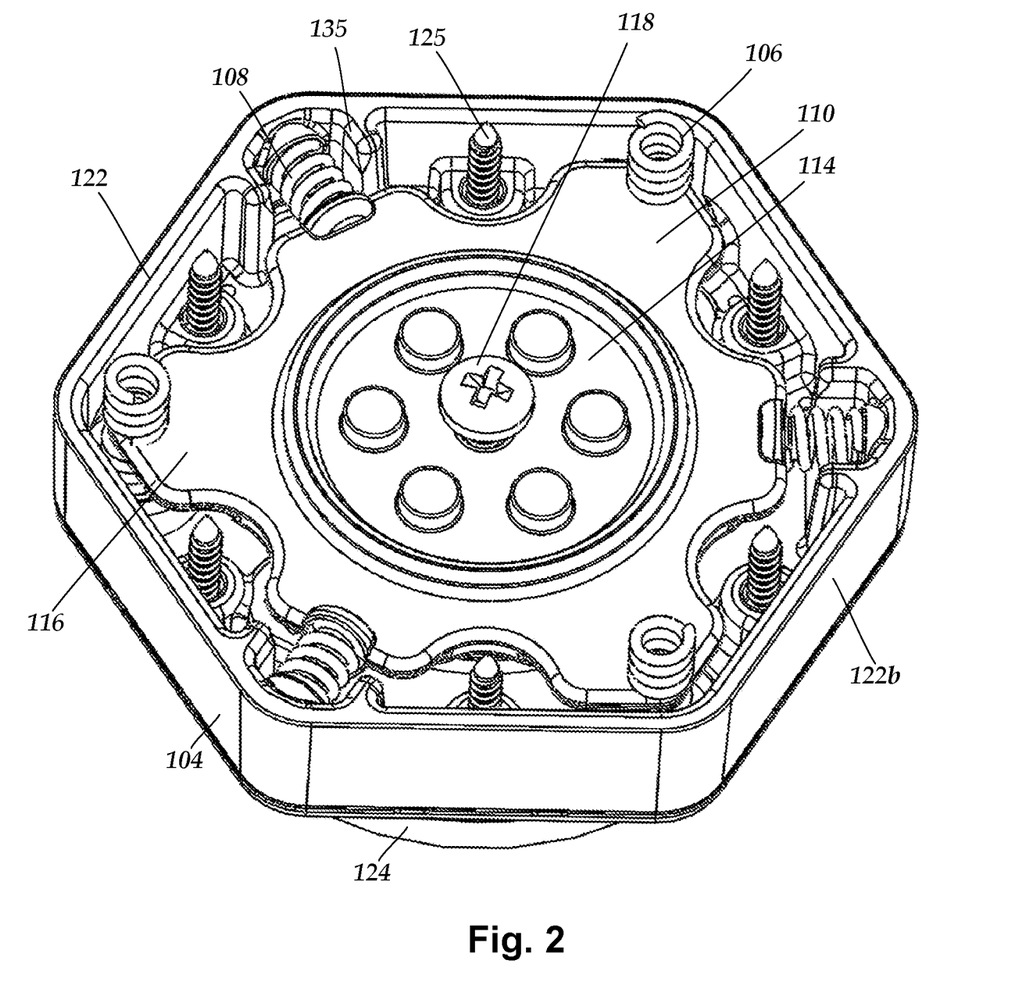
FIG. 2 is a schematic top view of a portion of the mount of FIG. 1A with a portion of a base housing removed to view the interior of the base housing and a floating flange, according to the invention.

The floating flange 110 resides within the base housing 122 of the base unit 104. In at least some embodiments, the optional mounting flange 112 is disposed outside of, or extends out of, the base housing 122. As illustrated in FIG. 2, the floating flange 110 includes a central portion 114 and multiple fingers 116 extending from the central portion 114. The fingers 116 engage the first and second springs 106, 108 as presented in more detail below.

Returning to FIGS. 1A and 1B, in at least some embodiments, the optional mounting flange 112 is separate from the floating flange 110 and coupled to the floating flange by a fastener 118, such as a screw, bolt, adhesive, or the like or any combination thereof. In at least some other embodiments, the mounting flange 112 and the floating flange 110 are formed together and not separable. In at least some embodiments, the optional mounting flange 112 includes a stem 113 for coupling to the floating flange 110. In at least some embodiments, the mounting flange 112 includes multiple mounting holes 120 for receiving fasteners when mounting the mounting flange to an object or a surface.

The base housing 122 includes exterior walls 126 that define a cavity 128 within which the floating flange 110 is disposed. In at least some embodiments, the base housing 122 has two, three or more parts 122a, 122b, 122c that are fastened together by one or more fasteners 125 (FIG. 2), such as screws, bolts, pins, a snap-fit arrangement, an adhesive, or the like or any combination thereof, after the first and second springs 106, 108 and floating flange 110 are inserted into the cavity 128.

In at least some embodiments, the base housing 122 defines multiple spring receptacles 130 within which the first springs 106 reside. In at least some embodiments, each of the spring receptacles 130 is defined by the exterior walls 126 and at least one interior sidewall 131. In at least some embodiments, each of the spring receptacles 130 includes opposing first mounting posts 132 upon which the first spring 106 is mounted.

In at least some embodiments, for each of the first springs 106, a finger 116 of the floating flange 110 is interested between coils 109 of the first spring. In at least some embodiments, such fingers 116 of the floating flange 110 include one or more protrusions 111 that extend from a body 110a of the finger along the floating axis 107 defined by the first spring. The protrusions 111 resided within the first spring 106. This prevents or resists disengagement of the floating flange 110 from the first spring 106.

In at least some embodiments, the base housing 122 also defines multiple second receptacles 134 from which the second springs 108 extend. In at least some embodiments, each of the second receptacles 134 is defined by the exterior walls 126 and at least one interior sidewall 135 (FIG. 2). In at least some embodiments, each of the second receptacles 134 includes a second mounting post 136 upon which the second spring 108 is mounted. In at least some embodiments, for each of the second springs 108 a portion of a finger 116 of the floating flange 110 extends within the coils 109 of the second spring 108 to couple the floating flange to the second springs.

Figure 3:
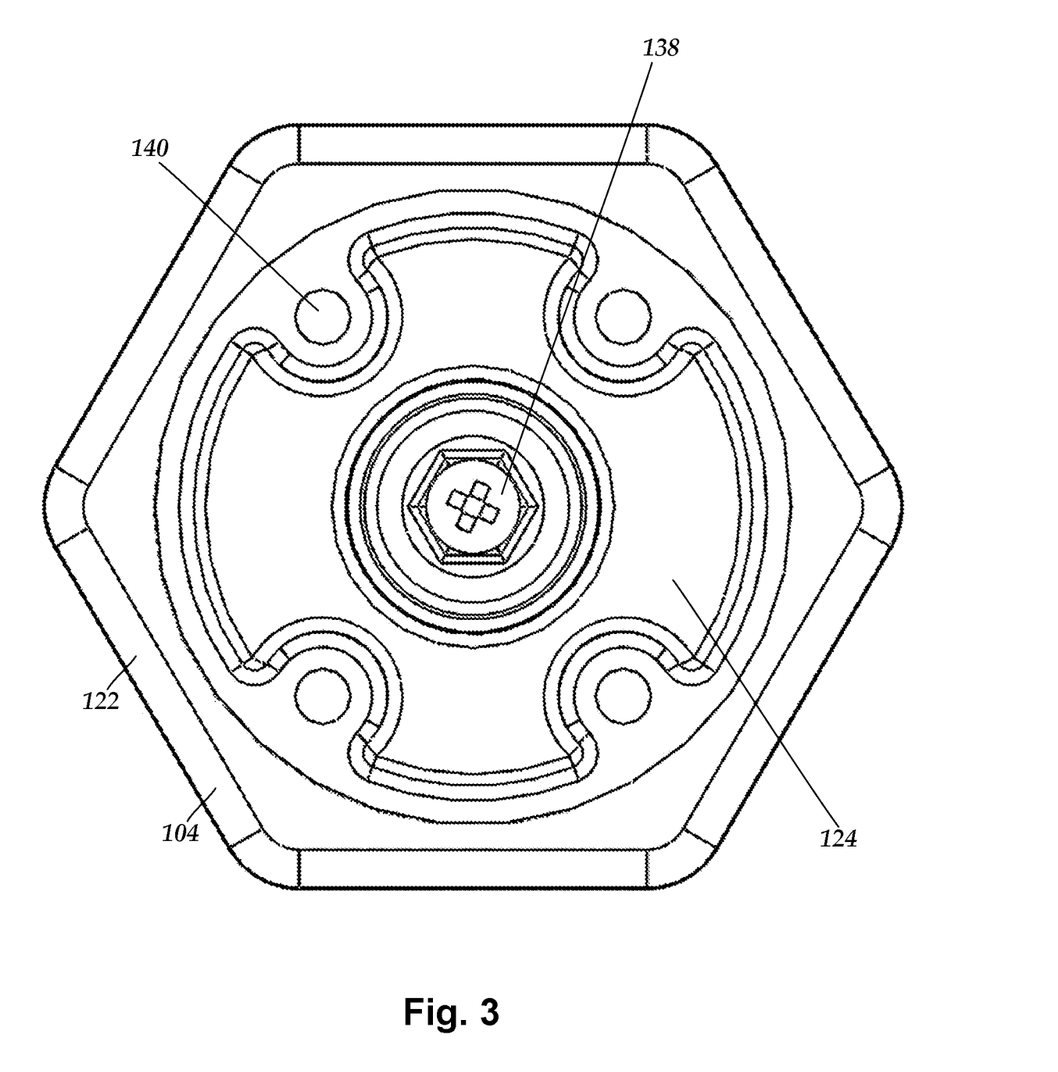
FIG. 3 is a schematic top view of a portion of the mount of FIG. 1A, according to the invention.

In at least some embodiments, the optional base flange 124 is separate from the base housing 122 and coupled to the base flange by a fastener 138, such as a screw, bolt, adhesive, or the like or any combination thereof. In at least some other embodiments, the base flange 124 and the base housing 122 are formed together and not separable. In at least some embodiments, the optional base flange 124 includes a stem 125 for coupling to the base housing 122. In at least some embodiments, the base flange 124 includes multiple mounting holes 140 (FIG. 3) for receiving fasteners when mounting the base flange to an object or a surface.

In at least some embodiments, the base flange 124 or the mounting flange 112 (or both) is made of a softer or more flexible material than other portions of the mount 100. For example, the material of the base flange 124 or the mounting flange 112 (or both) has a durometer in a range of 70 to 90 Shore A. In at least some embodiments, the base flange 124 or the mounting flange 112 (or both) is made of thermoplastic rubber, thermoplastic elastomer, thermoplastic polyurethane, or the like or any combination thereof.

Figure 4:
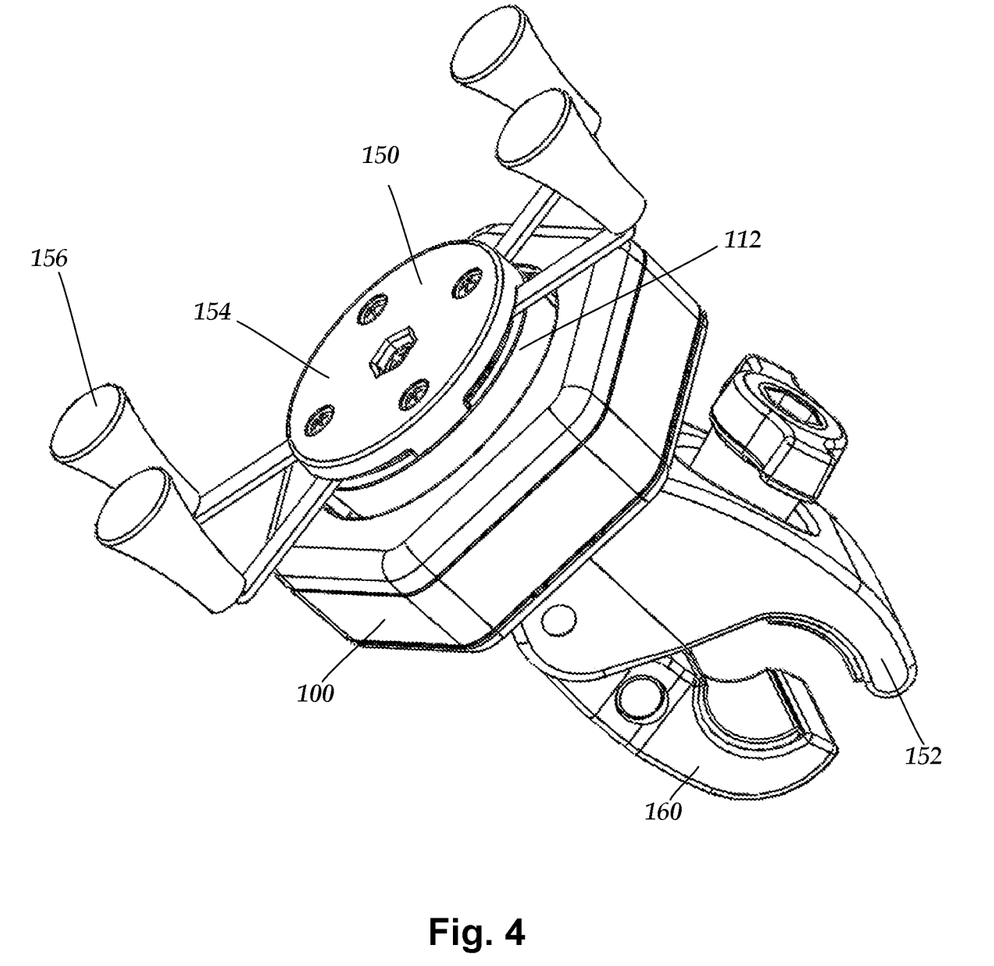
FIG. 4 is a schematic perspective view of the mount of FIG. 1A attached to two attachments arrangements, according to the invention.
Figure 5:
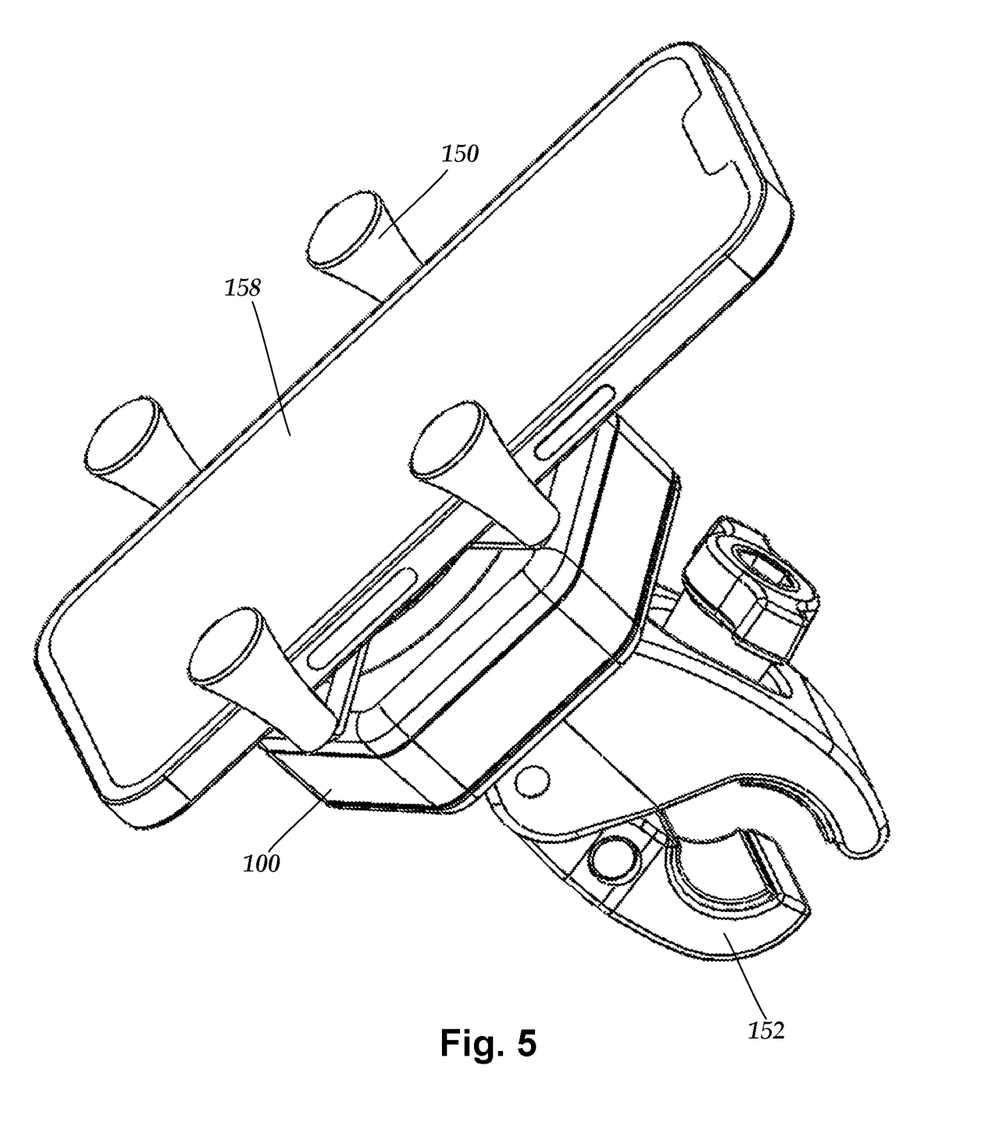
FIG. 5 is a schematic perspective view of the mount and two attachments arrangements of FIG. 4 with a mobile device attached thereto, according to the invention.

FIGS. 4 and 5 illustrate a first mounting arrangement 150 attached to the mounting flange 112 of the mount 100 and a second mounting arrangement 152 attached to the base flange 124 of the mount. The first mounting arrangement 150 includes a central body 154 with four arms 156 extending from the central body for receiving a device 158 (FIG. 5), such as a mobile phone or tablet. The second mounting arrangement 152 includes a clamp 160 for clamping to another object, such as a bar, table, or other surface. It will be recognized that any other suitable mounting arrangement can be used including, but not limited to, mounting arrangements described in U.S. Pat. Nos. 5,845,885; 6,561,476; 7,320,50; 7,997,554; 8,454,178; 8,505,861; 9,831,904; RE42,060; RE42,581; and RE43,806, all of which are incorporated herein by reference in their entireties. It will also be understood that the mounting flange 112 or base flange 126 can be directly mounted to a surface or other object without an intervening mounting arrangement.

As an example of use for the embodiment illustrated in FIGS. 4 and 5, a mobile phone (i.e., device 158) can be attached to the first mounting arrangement 150, as illustrated in FIG. 5. The first mounting arrangement 150 is attached to the mounting flange 112 which is coupled to the floating flange 110. The second mounting arrangement 152 can be attached to a vehicle, such as the handlebar of a motorcycle or clamped onto a surface of a dashboard. The second mounting arrangement 252 is attached to the base flange 124 which is coupled to the base housing 122. As the vehicle moves, vibrations of the vehicle are dampened by the first and second springs 106, 108 so that any resulting vibration of the floating flange 110 and the mobile phone is substantially less than the vibrations of the vehicle.

Figure 6:
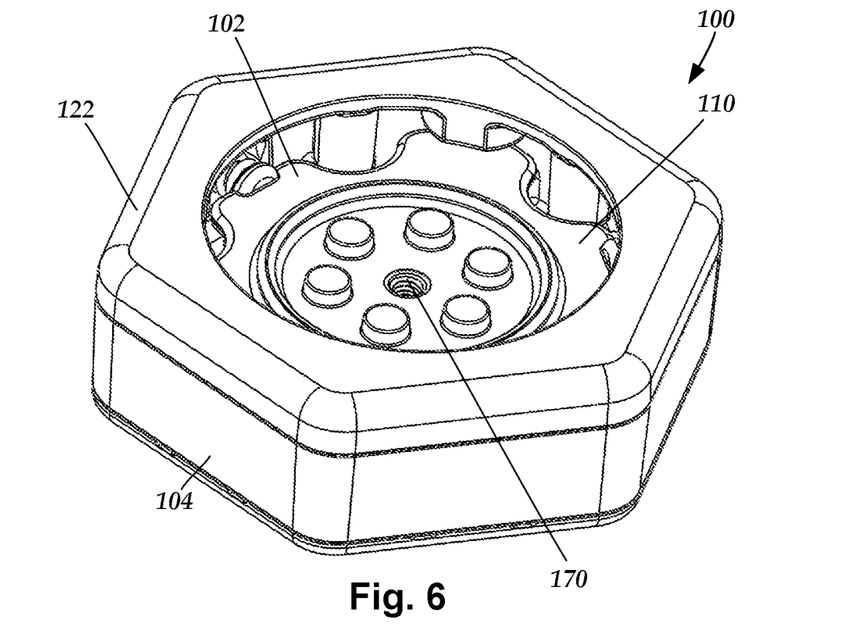
FIG. 6 is a schematic perspective top view of a second embodiment of a mount, according to the invention.

FIG. 6 illustrates one embodiment of a mount 100 without a mounting flange. A mounting arrangement or other object can be coupled directly to the floating flange 110. In at least some embodiments, the floating flange 110 includes one or more mounting holes 170 for attaching a mounting arrangement or other object or surface to the floating flange.

Figure 7:
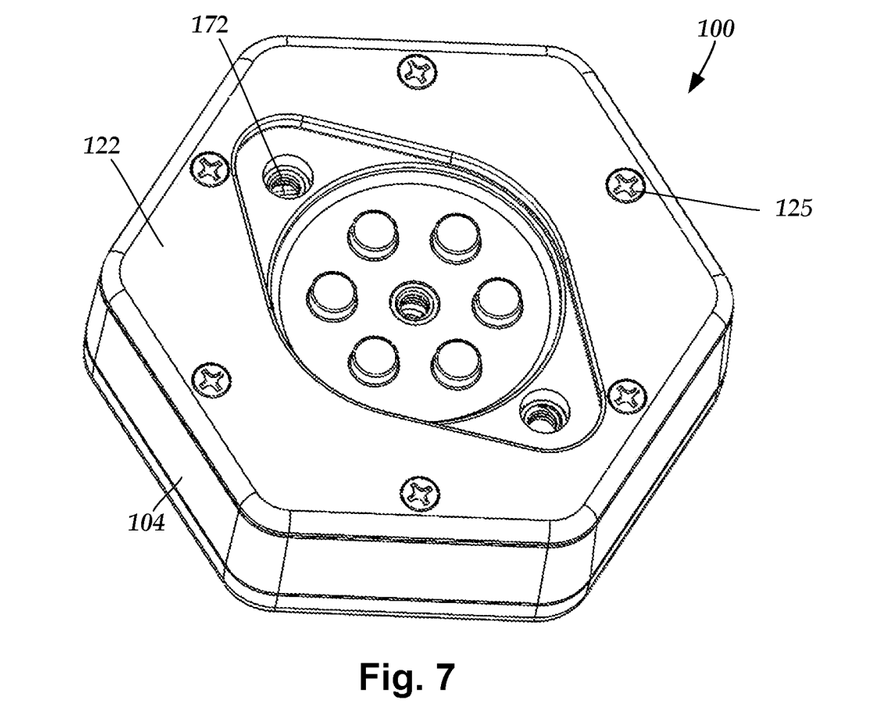
FIG. 7 is a schematic perspective bottom view of a third embodiment of a mount, according to the invention.

Similarly, FIG. 7 illustrates one embodiment of a mount 100 without a base flange. A mounting arrangement or other object can be coupled directly to the base housing 122. In at least some embodiments, the base housing 122 includes mounting holes 172 for attaching a mounting arrangement or other object or surface to the base housing.

Figure 8:
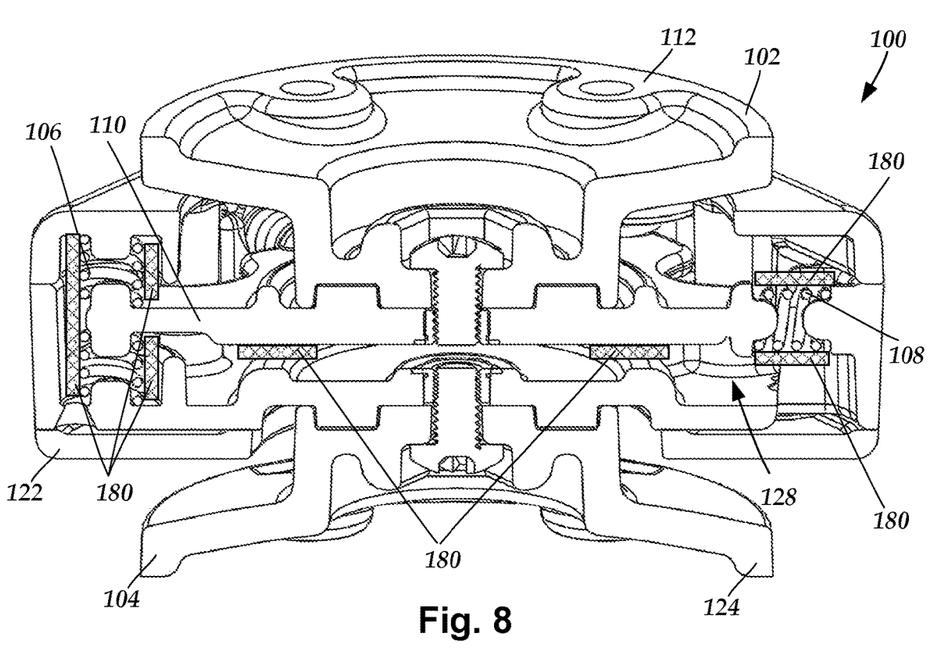
FIG. 8 is a schematic perspective, cross-sectional view of the mount of FIG. 1A illustrating regions for optional application of vibration dampening grease, according to the invention.

In at least some embodiments, a vibration dampening grease (or other lubricant) 180 can be included around the first springs 106, around the second springs 108, or between the floating flange 110 and the base housing 122 or any combination thereof, as illustrated in FIG. 8. Examples of vibration dampening greases (or other lubricants) include, but are not limited to, Molykote® Specialty Lubricants (for example, Molykote® AI-6159 Grease, Molykote® AS-880N Grease, Molykote® G-1033 (or G-1041, G-1056, G-1074, G-1079) Grease, and other Molykote® Products) from DuPont, Wilmington, DE, USA and Nye Lubricants dampening greases (for example, NyoGel 774 greases, Fluorocarbon Gel 868, 880, 891, and 835 greases, and Uniflor 8172 and 8322 greases) from Nye Lubricants, Fairhaven, MA, USA.

The above specification provides a description of the structure, manufacture, and 10 use of the invention. Since many embodiments of the invention can be made without departing from the spirit and scope of the invention, the invention also resides in the claims hereinafter appended.

What is claimed is new and desired to be protected by Letters Patent of the United States is:

1. A mount, comprising:
a floating unit comprising a floating flange, wherein the floating flange comprises a central portion and at least six fingers extending from the central portion and distributed around a perimeter of the central portion;
a base unit comprising a base housing, the base housing comprising exterior walls and a plurality of spring mounts extending inwardly from the exterior walls;
a plurality of first springs disposed in the base housing and oriented parallel to a first floating axis, wherein each of the first springs is mounted on at least one of the spring mounts and receives a portion of one of the fingers of the floating flange that extends orthogonally relative to the first floating axis and between adjacent coils of the first spring; and
a plurality of second springs disposed in the base housing and oriented orthogonally to the first springs, where each of the second springs is mounted on at least one of the spring mounts and receives a portion of one of the fingers of the floating flange extending into the second spring, wherein the first and second springs allow the floating unit and the base unit to move relative to each other.

2. The mount of claim 1, wherein the base housing defines a plurality of spring receptacles, wherein the first springs are disposed within the spring receptacles of the base unit.

3. The mount of claim 2, wherein the base housing comprises a plurality of interior walls, wherein the interior walls and the exterior walls define the spring receptacles.

4. The mount of claim 2, wherein the plurality of spring mounts comprises a plurality of pairs of opposing spring mounts, wherein each of the pairs of opposing spring mounts is disposed in a different one of the spring receptacles.

5. The mount of claim 1, wherein each of the fingers of the floating flange that are received by the first springs comprises a body and at least one protrusion extending from the body parallel to the first floating axis.

6. The mount of claim 1, wherein the floating unit further comprises a mounting flange coupled to the floating flange and configured for coupling to a device or a surface.

7. The mount of claim 6, wherein the mounting flange is made of material having a durometer in a range of 70 to 90 Shore A.

8. The mount of claim 6, wherein the mounting flange is made of thermoplastic rubber, thermoplastic elastomer, thermoplastic polyurethane, or any combination thereof.

9. A system comprising:
the mount of claim 6; and
a first mounting arrangement coupled to the mounting flange for coupling the mount to a first object.

10. The system of claim 9, wherein the base unit further comprises a base flange coupled to the base housing, the system further comprising a second mounting arrangement coupled to the base flange for coupling the mount to a second object.

11. The mount of claim 1, wherein the base unit further comprises a base flange coupled to the base housing and configured for coupling to a device or a surface.

12. The mount of claim 1, further comprising vibration dampening grease disposed around at least one of the first or second springs.

13. The mount of claim 1, further comprising vibration dampening grease disposed between the floating flange and the base housing.

14. A system comprising:
the mount of claim 1; and
a first mounting arrangement coupled to either the floating flange or the base housing for coupling the mount to an object.

15. A system comprising:
the mount of claim 1;
a first mounting arrangement coupled to the floating flange for coupling the mount to a first object; and
a second mounting arrangement coupled to the base housing for coupling the mount to a second object.

16. A mount, comprising:
- a base housing comprising exterior walls defining a cavity within the base housing;
- at least three first compression springs disposed in the base housing and oriented with a compression axis of each of the first compression springs parallel to a first floating axis;
- at least three second compression springs oriented with a compression axis of each of the second compression springs in a plane orthogonal to the first floating axis; and
- a floating flange suspended within the cavity of the base housing by the first compression springs and the second compression springs so that the floating flange and the base housing can move relative to each other.

17. The mount of claim 16, further comprising a mounting flange coupled to the floating flange and configured for coupling to a device or a surface.

18. The mount of claim 16, further comprising a base flange coupled to the base housing and configured for coupling to a device or a surface.

19. The mount of claim 16, further comprising vibration dampening grease disposed around at least one of the first or second compression springs.

20. The mount of claim 16, further comprising vibration dampening grease disposed between the floating flange and the base housing.

* * * * *